United States Patent
Tanaka et al.

(10) Patent No.: US 9,588,365 B2
(45) Date of Patent: Mar. 7, 2017

(54) LIQUID CRYSTAL DISPLAY AND MANUFACTURING METHOD THEREOF

(71) Applicant: Samsung Display Co., Ltd., Yongin, Gyeonggi-Do (KR)

(72) Inventors: Sakae Tanaka, Suwon-si (KR); Hiroshi Yoshimoto, Seoul (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 79 days.

(21) Appl. No.: 14/667,784

(22) Filed: Mar. 25, 2015

(65) Prior Publication Data

US 2016/0103374 A1    Apr. 14, 2016

(30) Foreign Application Priority Data

Oct. 13, 2014    (KR) .................. 10-2014-0137544

(51) Int. Cl.
| | | |
|---|---|---|
| *G02F 1/1339* | (2006.01) | |
| *G02F 1/1333* | (2006.01) | |
| *G02F 1/1343* | (2006.01) | |
| *G02F 1/1362* | (2006.01) | |

(52) U.S. Cl.
CPC ...... *G02F 1/133345* (2013.01); *G02F 1/1339* (2013.01); *G02F 1/134309* (2013.01); *G02F 1/136286* (2013.01); *G02F 2001/133357* (2013.01); *G02F 2001/134372* (2013.01)

(58) Field of Classification Search
CPC ............................. G02F 1/1339; G02F 1/1368
See application file for complete search history.

(56) References Cited

U.S. PATENT DOCUMENTS

| | | | |
|---|---|---|---|
| 7,423,716 B2 | 9/2008 | Konno et al. | |
| 7,483,106 B2 | 1/2009 | Ito et al. | |
| 7,688,413 B2 | 3/2010 | Ito | |
| 7,705,946 B2 | 4/2010 | Hirota | |
| 7,755,723 B2 | 7/2010 | Ino | |
| 7,777,852 B2 | 8/2010 | Kawasaki et al. | |
| 8,194,219 B2* | 6/2012 | Hirota ............... | G02F 1/133753 349/141 |
| 8,665,413 B2* | 3/2014 | Lee ..................... | G02F 1/13392 349/155 |
| 9,069,214 B2* | 6/2015 | Nakamura .......... | G02F 1/13392 |
| 2008/0259267 A1* | 10/2008 | Ashizawa ........... | G02F 1/13394 349/155 |

(Continued)

FOREIGN PATENT DOCUMENTS

| | | |
|---|---|---|
| JP | 2004341465 A | 12/2004 |
| JP | 2012118199 A | 6/2012 |

(Continued)

*Primary Examiner* — Timothy L Rude
(74) *Attorney, Agent, or Firm* — Cantor Colburn LLP

(57) ABSTRACT

A liquid crystal display includes: a substrate; a gate line and a data line on the substrate, and insulated from and crossing each other; a thin film transistor connected to the gate line and the data line; an interlayer insulating layer on the thin film transistor; a coating member on the interlayer insulating layer, the coating member elongated to overlap the data line; a common electrode on the interlayer insulating layer, the common electrode overlapping the coating member; a planarization layer covering the common electrode; and a pixel electrode on the planarization layer.

15 Claims, 13 Drawing Sheets

(56) References Cited

U.S. PATENT DOCUMENTS

| | | | |
|---|---|---|---|
| 2009/0015780 A1* | 1/2009 | Choi | .................. G02F 1/13394 349/156 |
| 2012/0257156 A1 | 10/2012 | Hiratsuka et al. | |
| 2013/0057820 A1* | 3/2013 | Hyodo | .................. G02F 1/1337 349/155 |
| 2014/0293199 A1 | 10/2014 | Sakae et al. | |

FOREIGN PATENT DOCUMENTS

| KR | 100433662 B1 | 5/2004 |
|---|---|---|
| KR | 1020110068271 A | 6/2011 |
| KR | 1020130015245 A | 2/2013 |

* cited by examiner

LIQUID CRYSTAL DISPLAY AND MANUFACTURING METHOD THEREOF

This application claims priority to Korean Patent Application No. 10-2014-0137544 filed on Oct. 13, 2014, and all the benefits accruing therefrom under 35 U.S.C. §119, the entire contents of which are incorporated herein by reference.

BACKGROUND

1. Field

The invention relates to a liquid crystal display and a manufacturing method thereof.

2. Description of the Related Art

A liquid crystal display, which is one of the most common types of flat panel displays, is a display device that applies voltages to electrodes to thereby rearrange liquid crystal molecules of a liquid crystal layer so that an amount of light transmitted may be adjusted.

The liquid crystal display has a merit of relatively small thickness, but has a drawback in that side visibility thereof is lower compared with front visibility thereof. In order to overcome the drawback, various types of liquid crystal arrangements and driving methods are being developed. As a means for implementing a relatively wide viewing angle, a liquid crystal display in which a pixel electrode and a common electrode are disposed in a single display panel including a base substrate has attracted attention.

This horizontal field mode liquid crystal display forms a relatively thick planarization layer at a pixel area to planarize the thin film transistor array display panel and the color filter array display panel.

SUMMARY

In a liquid crystal display, a polyimide alignment layer is employed to horizontally align the liquid crystal molecules. In a method of forming the alignment layer, a rubbing device contacts and rubs a polyimide material for forming the polyimide alignment layer so as to generate a horizontal alignment control force by stretching the surface of the material for forming the alignment layer in a predetermined direction. If a lower portion of the alignment layer is not flat but is rough, a contact moiré is easily generated. Therefore, a relatively thick planarization layer is employed at a pixel area to planarize the thin film transistor array display panel and the color filter array display panel.

Also, in a method of forming a liquid crystal display, a clean room in which elements of the liquid crystal display are processed is relatively easily contaminated by dust or particles generated at the rubbing device. Further, if the rubbing process of about 500 strokes to about 1000 strokes is performed to form the alignment layer, a rubbing fiber for the rubbing process is worn and is frequently exchanged. An operation rate of the rubbing device is deteriorated by the exchange process of the rubbing fiber.

Also, in the rubbing process, static electricity is generated such that an element of the liquid crystal display such as a thin film transistor is damaged, thereby reducing a process yield of manufacturing a liquid crystal display.

In addition, the thin film transistor array display panel and the color filter array display panel must be completely planarized to perform the rubbing process such that the process becomes complicated, thereby increasing complexity and cost of a manufacturing process. For example, a contact hole must be formed in the relatively thick planarization layer, such that forming the contact hole in a relatively small size is difficult. Further, among the pixel electrodes disposed at the same layer among layers of a display panel, one pixel electrode is undesirably influenced by the electric field of an adjacent pixel electrode such that cross-talk is generated when using a positive liquid crystal.

One or more exemplary embodiment provides a liquid crystal display for which a manufacturing process is simplified, a manufacturing cost is reduced, and in which cross-talk is reduced or effectively prevented.

An exemplary embodiment of a liquid crystal display includes: a substrate; a gate line and a data line on the substrate, insulated from and crossing each other; a thin film transistor connected to the gate line and the data line; an interlayer insulating layer on the thin film transistor; a coating member on the interlayer insulating layer, the coating member elongated to overlap the data line; a common electrode on the interlayer insulating layer, the common electrode overlapping the coating member; a planarization layer covering the common electrode; and a pixel electrode on the planarization layer.

The common electrode may include a shielding common electrode overlapping the coating member overlapping the data line; and a plane common electrode extended from the shielding common electrode and away from the data line. A maximum distance from the substrate to the shielding common electrode overlapping the coating member overlapping the data line may be greater than a maximum distance from the substrate to the pixel electrode.

The pixel electrode may include a plurality of branch electrodes separated from each other, and a connection electrode connecting the branch electrodes to each other. The liquid crystal display man further include a first pixel coating member between adjacent branch electrodes among the plurality of branch electrodes, in a plan view.

The first pixel coating member may be in a same layer as the coating member among layers disposed on the substrate.

The liquid crystal display may include a second pixel coating member overlapping the plurality of branch electrodes.

The second pixel coating member may be in a same layer as the coating member among layers disposed on the substrate.

The first pixel coating member and the second pixel coating member may include a transparent insulator.

A width of the coating member may be larger than a width of the data line.

The coating member may include an insulator having a dielectric rate of less than about 3.0.

The thin film transistor may include a gate electrode as a portion of the gate line, a source electrode as a portion of the data line, and a drain electrode separated from the source electrode. A common electrode groove may be defined in the common electrode to expose a portion of the drain electrode, a contact hole may be defined in the interlayer insulating layer and the planarization layer, and the drain electrode may be connected to the pixel electrode via the common electrode groove and the contact hole.

Further, an exemplary embodiment of a manufacturing method of a liquid crystal display includes: forming a gate line and a data line on a substrate; forming a thin film transistor connected to the gate line and the data line; forming an interlayer insulating layer covering the thin film transistor; forming a coating member on the interlayer insulating layer, the coating member elongated to overlap the data line; forming a common electrode on the interlayer insulating layer, the common electrode overlapping the coating member; forming a planarization layer covering the common electrode; and forming a pixel electrode on the planarization layer.

The method may further include forming an alignment layer on the pixel electrode, and performing a light alignment process to the alignment layer.

The forming the common electrode may include forming a shielding common electrode overlapping the coating member overlapping the data line; and forming a plane common electrode extended from the shielding common electrode and away from the data line. A maximum distance from the substrate to the shielding common electrode overlapping the coating member overlapping the data line is greater than a maximum distance from the substrate to the pixel electrode.

The method may further include forming a first pixel coating member in a same layer as the coating member among layers disposed on the substrate. The pixel electrode may include a plurality of branch electrodes separated from each other, and a connection electrode connecting the branch electrodes to each other. The first pixel coating member may be between adjacent branch electrodes among the plurality of branch electrodes, in a plan view.

The method may further include forming a second pixel coating member in a same layer as the coating member among layers disposed on the substrate. The second pixel coating member overlaps the plurality of branch electrodes.

According to one or more exemplary embodiment of the invention, by forming the coating member of a predetermined height overlapping the data line, the shielding common electrode disposed overlapping the coating member is disposed further from the substrate than the pixel electrode, thereby blocking the electric field of the pixel electrode from that of a pixel electrode of an adjacent pixel area. Accordingly, since the electric field between adjacent pixel electrodes is blocked, the cross-talk is not generated by the electric field of the pixel electrode of the adjacent pixel area.

Also, according to one or more exemplary embodiment of the invention, since a relatively strong electric field is formed between the shielding common electrode positioned with the predetermined height and the pixel electrode, liquid crystal may be driven with a relatively small driving voltage, thereby minimizing power consumption.

Further, since according to one or more exemplary embodiment of the invention, the alignment layer is subjected to the alignment process using the light alignment process, a relatively thick planarization layer is obviated, thereby simplifying a manufacturing process and reducing the manufacturing cost of a liquid crystal display. Also, according to one or more exemplary embodiment of the invention, a liquid crystal display includes a relatively thin planarization layer such that a contact hole is easily formed in the relatively thin planarization layer and a size of the contact hole may be reduced, thereby improving the aperture ratio of the liquid crystal display.

In addition, since according to one or more exemplary embodiment of the invention, a separate rubbing device is obviated for the alignment process different from a conventional manufacturing process, static electricity or dust is not generated, thereby improving yield of the manufacturing process. Further, since the separate rubbing device is obviated for the alignment process, a disorder or defect at a step portion of the alignment layer is not generated in the light alignment process, thereby configuring the liquid crystal display to realize a clear black color.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
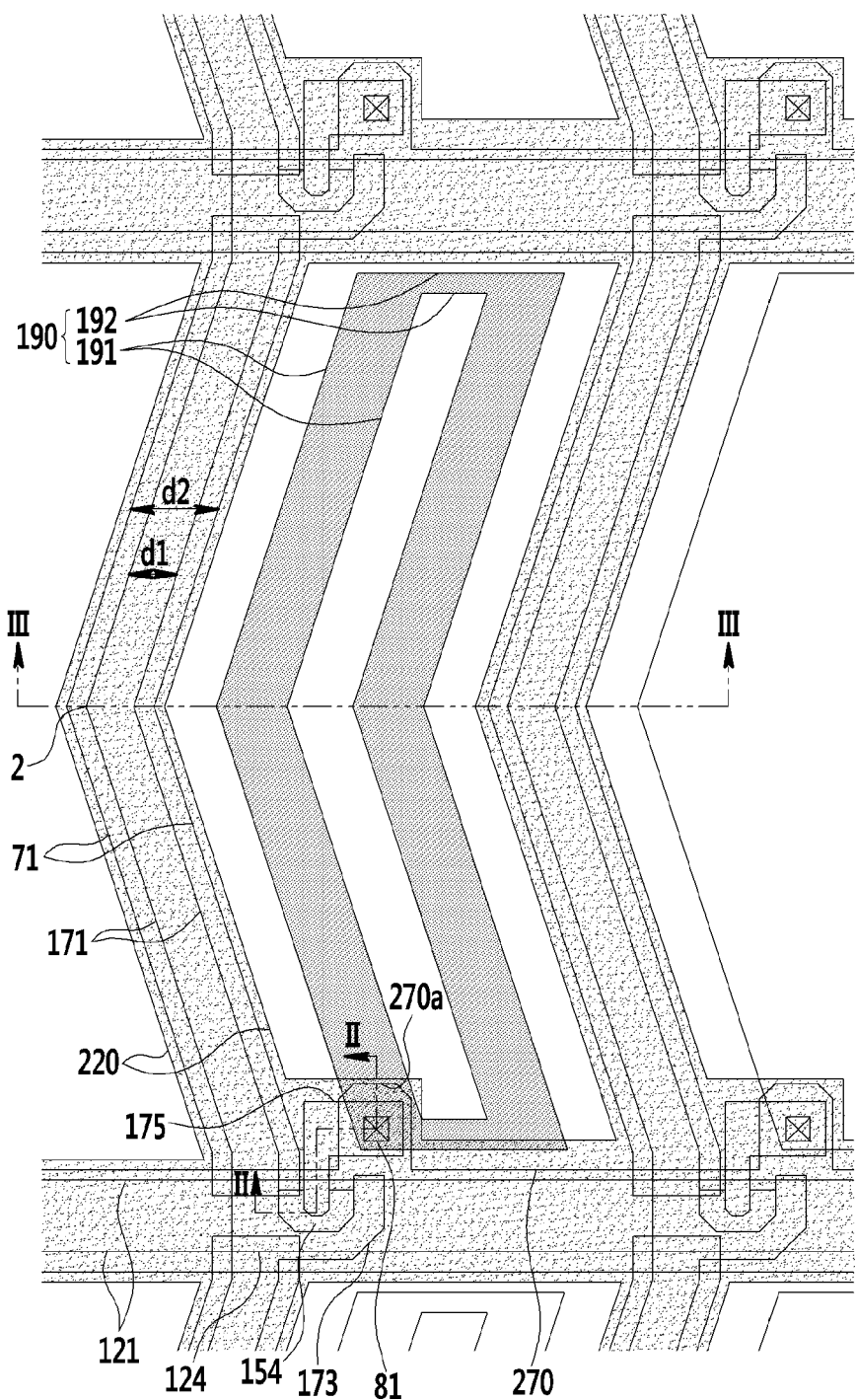
FIG. 1 is a plan view of an exemplary embodiment of a liquid crystal display according to the invention.

The invention will be described more fully hereinafter with reference to the accompanying drawings, in which exemplary embodiments of the disclosure are shown. As those skilled in the art would realize, the described exemplary embodiments may be modified in various different ways, all without departing from the spirit or scope of the invention.

Descriptions of parts not related to the disclosure are omitted, and like reference numerals designate like elements throughout the specification.

Further, since sizes and thicknesses of constituent members shown in the accompanying drawings are arbitrarily given for better understanding and ease of description, the invention is not limited to the illustrated sizes and thicknesses.

In the drawings, the thickness of layers, films, panels, regions, etc., are exaggerated for clarity. In the drawings, for better understanding and ease of description, the thicknesses of some layers and areas are exaggerated. It will be understood that when an element such as a layer, film, region, or substrate is referred to as being "on" another element, it can be directly on the other element or intervening elements may also be present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." In addition, unless explicitly described to the contrary, the word "comprise" and variations such as "comprises" or "comprising" will be understood to imply the inclusion of stated elements but not the exclusion of any other elements. Further, in the specification, an upper part of a target portion indicates an upper part or a lower part of the target portion, and it does not mean that the target portion is always positioned at the upper side based on a gravity direction.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Now, a liquid crystal display according to the invention will be described with reference to FIG. 1 to FIG. 3.

Figure 2:
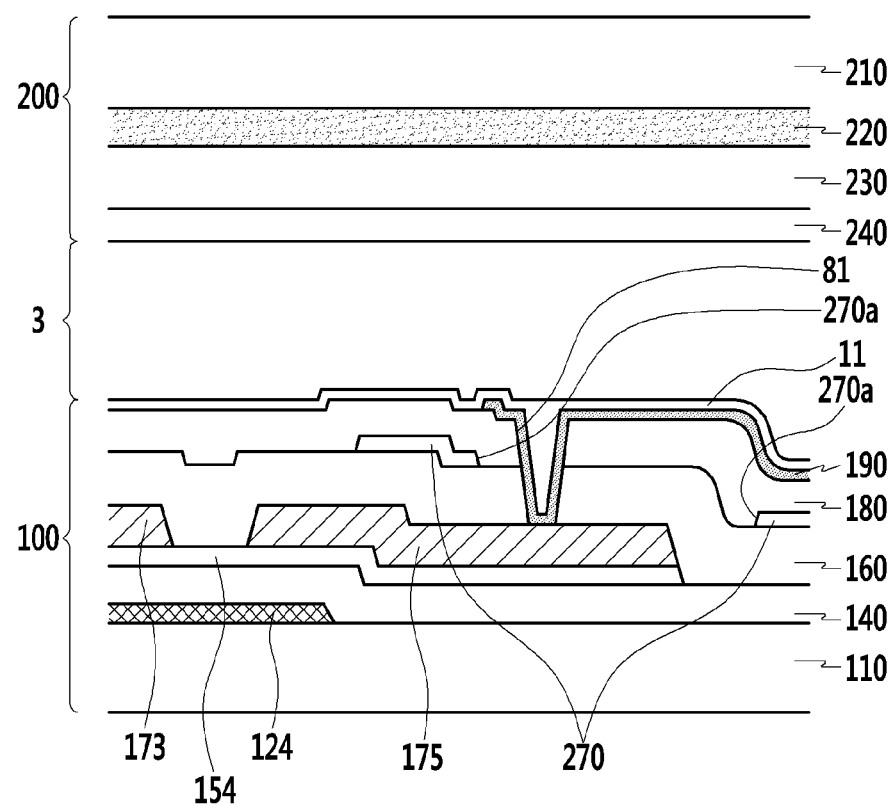
FIG. 2 is a cross-sectional view of the liquid crystal display of FIG. 1 taken along line II-II.
Figure 3:
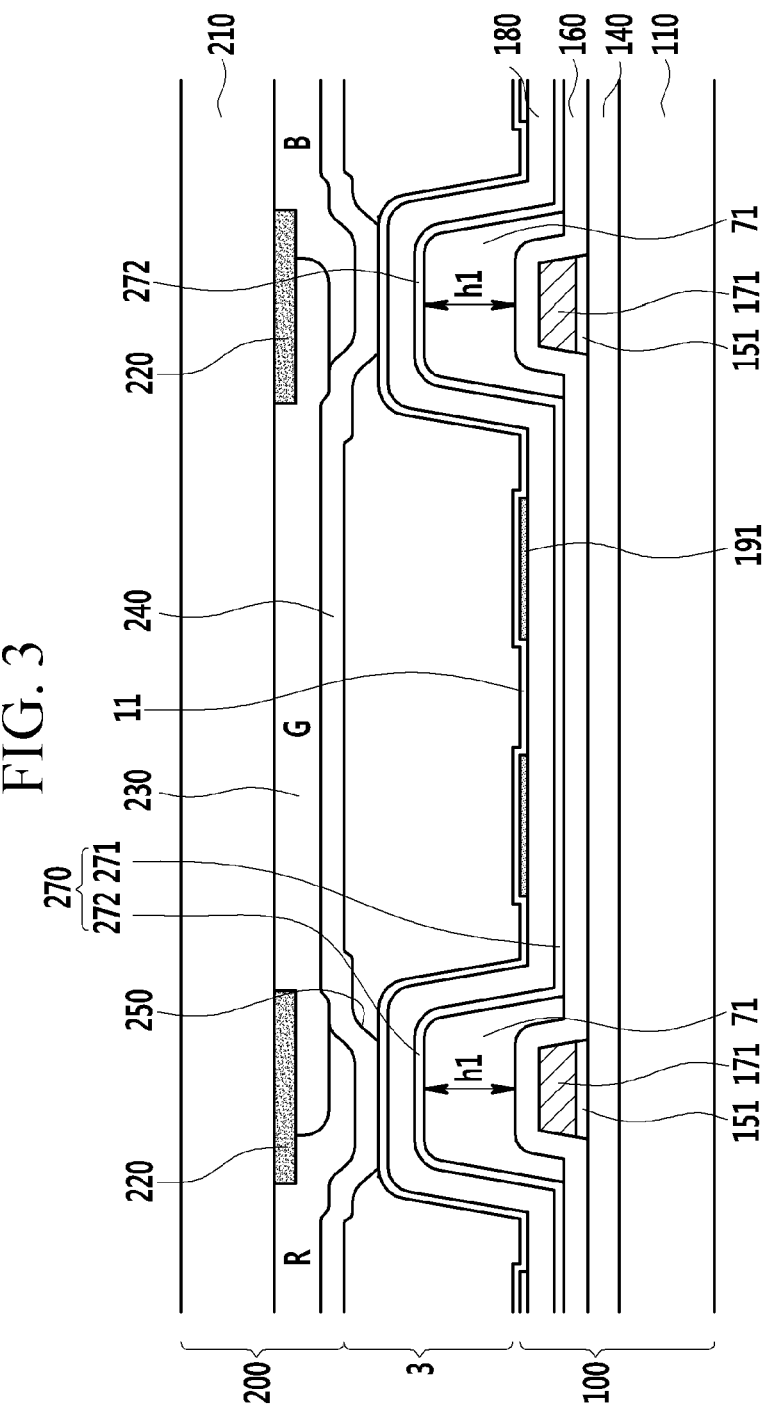
FIG. 3 is a cross-sectional view of the liquid crystal display of FIG. 1 taken along line III-III.

FIG. 1 is a plan view of an exemplary embodiment of a liquid crystal display according to the invention, FIG. 2 is a cross-sectional view of the liquid crystal display of FIG. 1 taken along line II-II, and FIG. 3 is a cross-sectional view of the liquid crystal display of FIG. 1 taken along line III-III.

As shown in FIG. 1 to FIG. 3, a liquid crystal display includes a lower display panel 100 and an upper display panel 200, and a liquid crystal layer 3 interposed therebetween.

First, the lower display panel 100 will be described.

A gate line 121 is positioned on a substrate 110 including transparent glass or plastic. The gate line 121 transmits a gate signal and is elongated to mainly extend in a transverse direction. Each gate line 121 includes a plurality of gate electrodes 124 protruded from a main portion thereof. Also, the gate line 121 may include a gate pad portion (not illustrated) for connection with another layer or an external driving circuit (not illustrated).

The gate line 121 may include aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti). The gate line 121 and portions extended from a main portion thereof may include a single layer structure. However, the gate line 121 and portions protruded from the main portion thereof may have a multilayered structure including at least two conductive layers having different physical properties.

A gate insulating layer 140 is disposed on the gate line 121. The gate insulating layer 140 includes a silicon nitride (SiNx) or a silicon oxide (SiOx).

A plurality of semiconductor stripes 151 including amorphous silicon or polysilicon are disposed on the gate insulating layer 140. The semiconductor stripes 151 are elongated to mainly extend in a longitudinal direction and include a plurality of projections 154 extending from a main portion thereof toward the gate electrodes 124.

A plurality of data lines 171 and a plurality of drain electrodes 175 are disposed on the semiconductors 151 and 154. Each data line 171 transmits a data signal and is elongated to mainly extend in the longitudinal direction, thereby crossing the gate line 121. The data line 171 has bent portion 2 having a bent shape in the plan view to improve transmittance.

Each data line 171 includes a plurality of source electrodes 173 that is protruded from a main portion thereof and extended toward the gate electrode 124. Each data line also includes a relatively wide end (not shown) for connecting to other layers or an external driving circuit (not illustrated).

Each drain electrode 175 is separated from the data line 171 and faces the source electrode 173 with respect to the gate electrode 124. The drain electrode 175 includes a bar-shaped first end portion and an extension having a relatively wide area at a second end portion thereof opposite to the first end portion. The bar-shaped first end portion is partially enclosed by the curved source electrode 173.

The gate electrode 124, the source electrode 173 and the drain electrode 175 form a thin film transistor ("TFT") along with the projections 154 of the semiconductor 151, and a channel of the TFT is formed in the projections 154 of the semiconductor 151 between the source electrode 173 and the drain electrode 175. The channel may include an exposed portion of the projections 154 of the semiconductor 151.

The data lines 171 include a refractory metal, such as molybdenum, chromium, tantalum and titanium, or their alloys, and may have a single layer structure, however, not being limited thereto. The data lines 171 and portions extended from the main portion thereof can have a multi-layer structure including a refractory metal film (not shown) and a low-resistance conductive layer (not shown). Examples of the multilayer structure can include a dual layer of a chromium or molybdenum (alloy) lower film and an aluminum (alloy) upper film, and a triple layer of a molybdenum (alloy) lower film, an aluminum (alloy) intermediate layer, and a molybdenum (alloy) upper film. Also, the data lines 171 and the drain electrodes 175 may include various other metals or conductors.

An interlayer insulating layer 160 is disposed on the data line 171, the drain electrode 175 and the exposed projections 154 of the semiconductor 151. The interlayer insulating layer 160 may include a silicon nitride (SiNx) or a silicon oxide (SiOx).

A coating member 71 of a predetermined height h1 is disposed corresponding to the data line 171, on the interlayer insulating layer 160. The height h1 may be a maximum dimension taken from a reference such as from an upper-most surface of the interlayer insulating layer 160 or the substrate 110. The coating member 71 may be elongated to extend along the data line 171 as illustrated in FIG. 1. In cross-section, the coating member 71 has a trapezoidal shape or a semi-circular shape. The height h1 of the coating member may be about 2 micrometers (μm) to about 4 μm. To completely cover the data line 171, a width d2 of the coating member 71 may be larger than the width d1 of the data line 171. At respective portions of the coating member 71 and the data line 171, the widths d1 and d2 are taken perpendicular to an extension direction of the portions. In an exemplary embodiment, for example, when the width d1 of the data line 171 is about 2 μm, the width d2 of the coating member 71 may be about 4 μm. The coating member 71 may include an insulator material having a relatively low dielectric ratio of less than about 3.0.

A common electrode 270 is disposed on the interlayer insulating layer 160 and the coating member 71. The common electrode 270 includes a plane common electrode 271 which is on the interlayer insulating layer 160 and covers most of a pixel area of the liquid crystal display, and a shielding common electrode 272 covering the coating member 71 of the predetermined height h1. The common electrode 270 is not disposed at a portion corresponding to the gate line 121. At the portion corresponding to the gate line 121 a common electrode groove 270a is defined in the common electrode 270 at a portion corresponding to the expansion of the drain electrode 175 having the relatively wide area.

The shielding common electrode 272 is disposed on the coating member 71 of the predetermined height h1 such that the shielding common electrode 272 is positioned higher than a pixel electrode 190 with reference to a same reference, thereby easily blocking the electric field of the pixel electrode 190 of the adjacent pixel areas. As illustrated in FIG. 3 for example, a maximum distance of the shielding common electrode 272 from an upper surface of the substrate 110 is greater than a maximum distance of the pixel electrode 190 from the upper surface of the substrate 110. Accordingly, the pixel electrode 190 is not influenced by the electric field of a pixel electrode in an adjacent pixel area such that cross-talk is not generated.

Also, in a conventional liquid crystal device, a high driving voltage is used to drive liquid crystal due to the electric field formed between common and pixel electrodes. In one or more exemplary embodiment of the invention, a relatively stronger electric field is formed between the shielding common electrode 272 positioned at the predetermined height and the pixel electrode 190 as compared to the conventional liquid crystal device. Therefore, liquid crystal in the liquid crystal display according to the invention is driven by a relatively lower driving voltage than that of the conventional liquid crystal display, thereby minimizing power consumption.

A planarization layer 180 is disposed to cover the interlayer insulating layer 160 and the common electrode 270. In an exemplary embodiment of forming a liquid crystal display, when using a light alignment process to align the liquid crystal molecules, a relatively thick thickness of the planarization layer 180 is obviated, differently from when using a rubbing alignment process. The planarization layer 180 has a relatively small thickness so as to prevent the pixel electrode 190 and the common electrode 270 from being electrically shorted.

Accordingly, in one or more exemplary embodiment according to the invention, since the planarization layer 180 is relatively thin, forming a contact hole 81 in the planarization layer 180 is simplified as compared to forming a contact hole in a conventional thick planarization layer. Additionally, in one or more exemplary embodiment according to the invention, since the planarization layer 180 is relatively thin, a size of the contact hole 81 defined in the planarization layer 180 may be reduced, thereby improving an aperture ratio of the liquid crystal display.

The planarization layer 180 may include an organic material or an inorganic material such as P-SiNx, P-SiOx, or P-SiONx.

The pixel electrode 190 is disposed on the planarization layer 180. The pixel electrode 190 includes branch electrodes 191 separated from each other and a connection electrode 192 connecting the branch electrodes 191 to each other. The branch electrodes 191 of the pixel electrode 190 are elongated to extend substantially parallel to extension directions of the data line 171 and may each be inclined at portions thereof to form a predetermined angle with respect to the gate line 121. The width of the branch electrode 191 taken perpendicular to a respective extension direction thereof may be about 1.5 μm to about 3 μm, and an interval which separates a pair of adjacent branch electrodes 191 may be about 2 μm to about 4 μm.

The pixel electrodes 190 are physically and electrically connected to the drain electrodes 175 via the contact holes 81, and receive data voltages from the drain electrodes 175. The pixel electrodes 190 applied with the data voltages and the common electrode 270 applied with the reference voltage generate an electric field that determines the orientations of liquid crystal molecules of the liquid crystal layer 3 between the two electrodes 190 and 270. Polarization of light that passes through the liquid crystal layer 3 changes depending on the rotation direction of the liquid crystal molecules.

The pixel electrode 190 may include a transparent conductive layer such as a transparent conductive oxide ("TCO") including, but not limited to, indium tin oxide ("ITO") and indium zinc oxide ("IZO").

An alignment layer 11 is disposed such as by coating on the pixel electrode 190 and the planarization layer 180, and the alignment layer 11 may be a horizontal alignment layer but is not limited thereto. In an exemplary embodiment of manufacturing a liquid crystal display, an alignment material for forming the alignment layer 11 is subjected to an alignment process including a light alignment process such that a relatively thick planarization layer is obviated, thereby simplifying the manufacturing process and reducing the manufacturing cost. Also, since a separate rubbing device for an alignment layer forming process is obviated, static electricity or dust is not generated, thereby improving a yield of the manufacturing process. Also, differently from using the rubbing device, a defect at a step portion of an alignment material layer defined by the relatively thick planarization layer is not generated in the light alignment process, thereby configuring a liquid crystal display to realize a clear black color.

Next, the upper display panel 200 will be described.

A light blocking member 220 is disposed on a substrate 210 including transparent glass or plastic. The light blocking member 220 is referred to as a black matrix and reduces or effectively prevents light leakage. Also, a plurality of color filters 230 is disposed on the substrate 210. The color filters 230 may include a red color filter R, a green color filter G, and a blue color filter B. Adjacent color filters 230 overlap each other on the light blocking member 220 and two color filters 230 are stacked at overlapping portions thereof, to thereby define a predetermined height from the substrate 210. These deposited color filters 230 define a spacer 250 in cooperation with other elements of the upper display panel 200.

An overcoat 240 is disposed on the color filter 230 and the light blocking member 220. The overcoat 240 may include the organic material and reduces or effectively prevents the color filters 230 from being exposed. In an exemplary embodiment, the overcoat 240 may be omitted. In the upper display panel 200, an alignment layer (not shown) may be disposed on the overcoat 240.

The liquid crystal layer 3 interposed between the lower display panel 100 and the upper display panel 200 includes liquid crystal molecules (not shown). The liquid crystal molecules may be aligned so that a major axis thereof is horizontal with respect to the surfaces of the two display panels 100 and 200 in the state where an electric field is not present.

In the liquid crystal display, a light unit (not shown) generating and providing light to the two display panels 100 and 200 may be further included such as outside and adjacent to the substrate 110 of the lower display panel 100.

The pixel electrode 190 applied with the data voltage and the common electrode 270 receiving the common voltage generate an electric field into the liquid crystal layer 3 and determine the orientation of the liquid crystal molecules of the liquid crystal layer 3, thereby displaying a corresponding image.

A manufacturing method of the liquid crystal display according to the invention will now be described with reference to FIG. 4 to FIG. 9.

Figure 4:
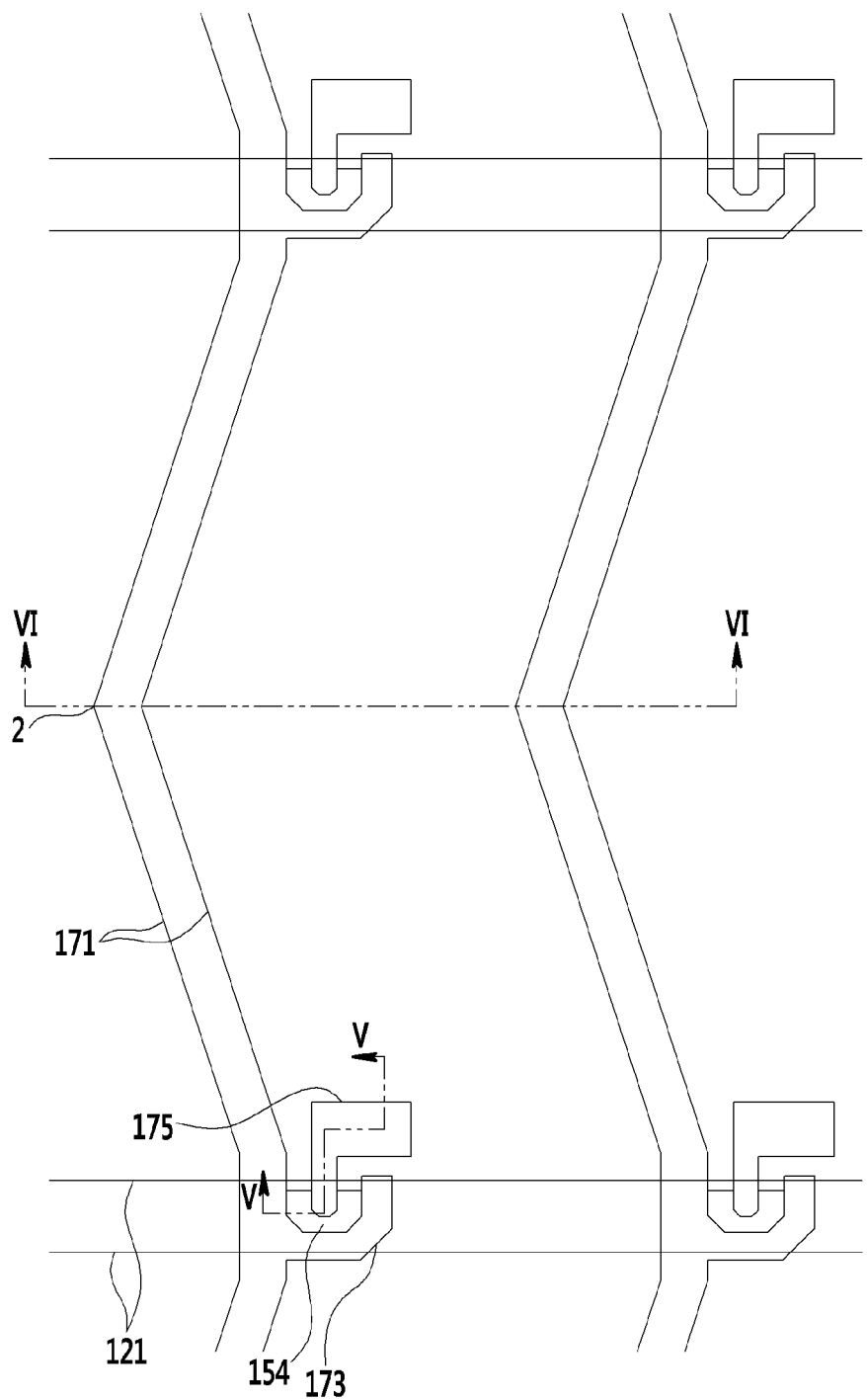
FIG. 4 and FIG. 7 are plan views of an exemplary embodiment of a manufacturing method of a liquid crystal display according to the invention.
Figure 5:
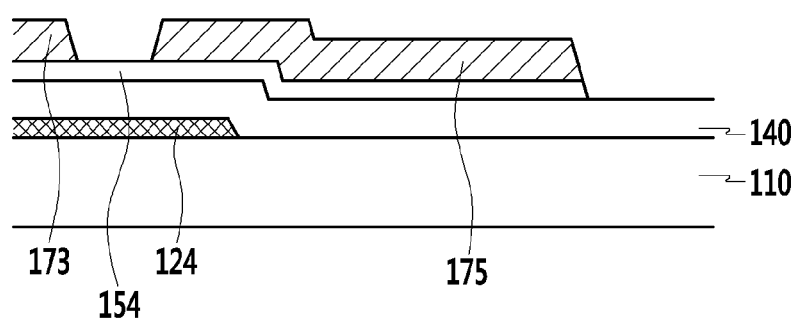
FIG. 5 is a cross-sectional view of the liquid crystal display of FIG. 4 taken along line V-V.
Figure 6:
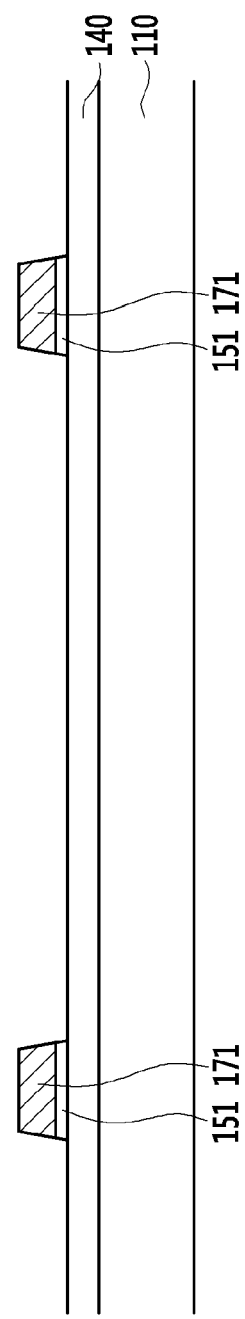
FIG. 6 is a cross-sectional view of the liquid crystal display of FIG. 4 taken along line VI-VI.
Figure 7:
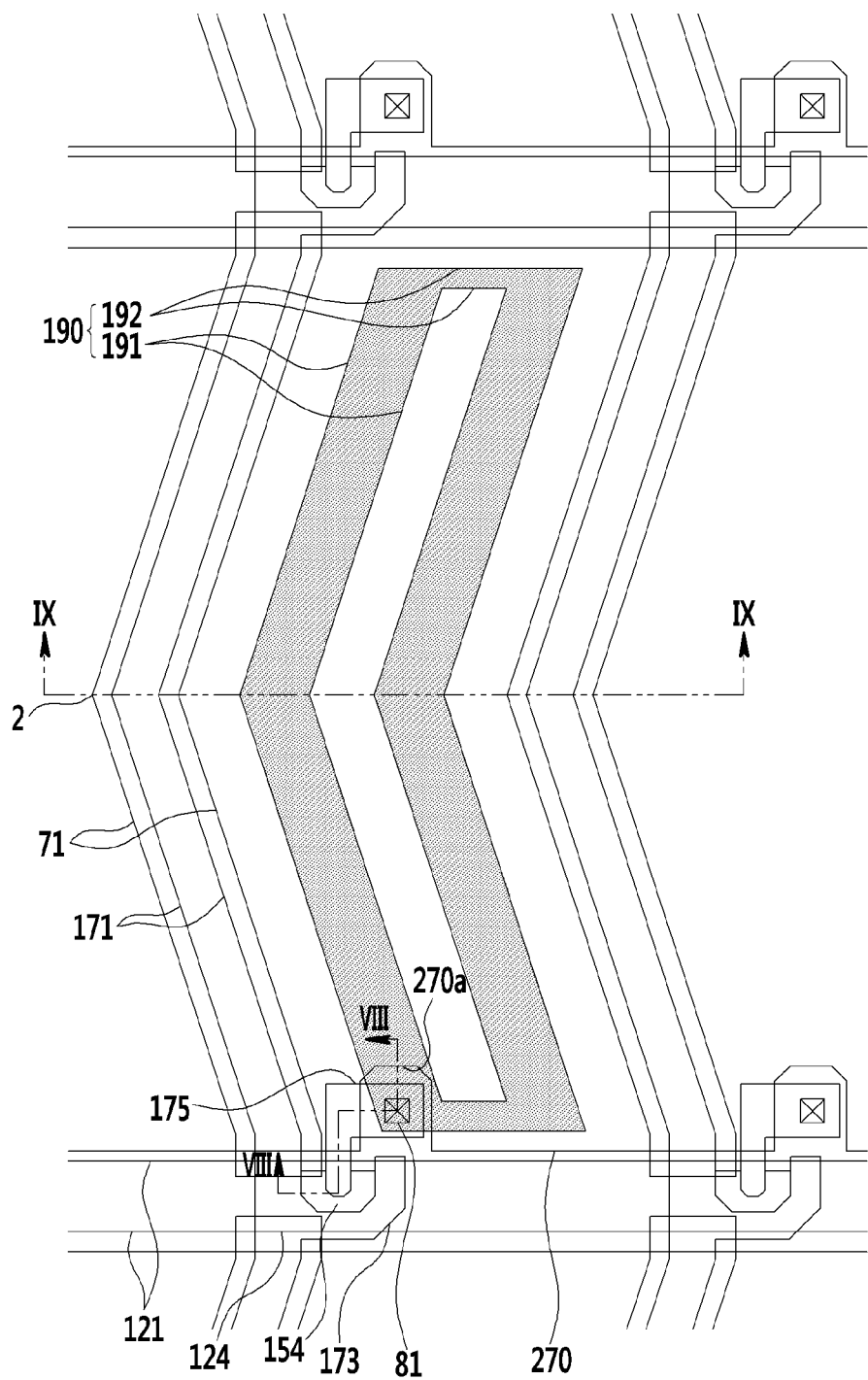
Figure 8:
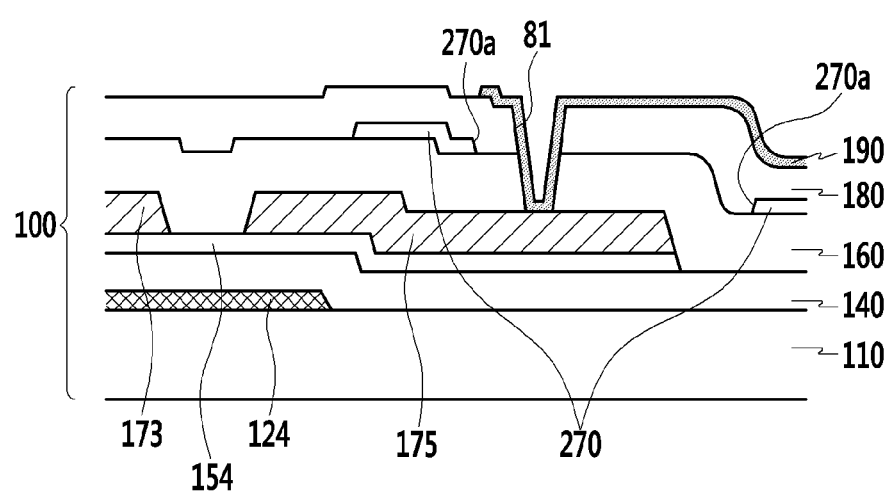
FIG. 8 is a cross-sectional view of the liquid crystal display of FIG. 7 taken along line VIII-VIII.
Figure 9:
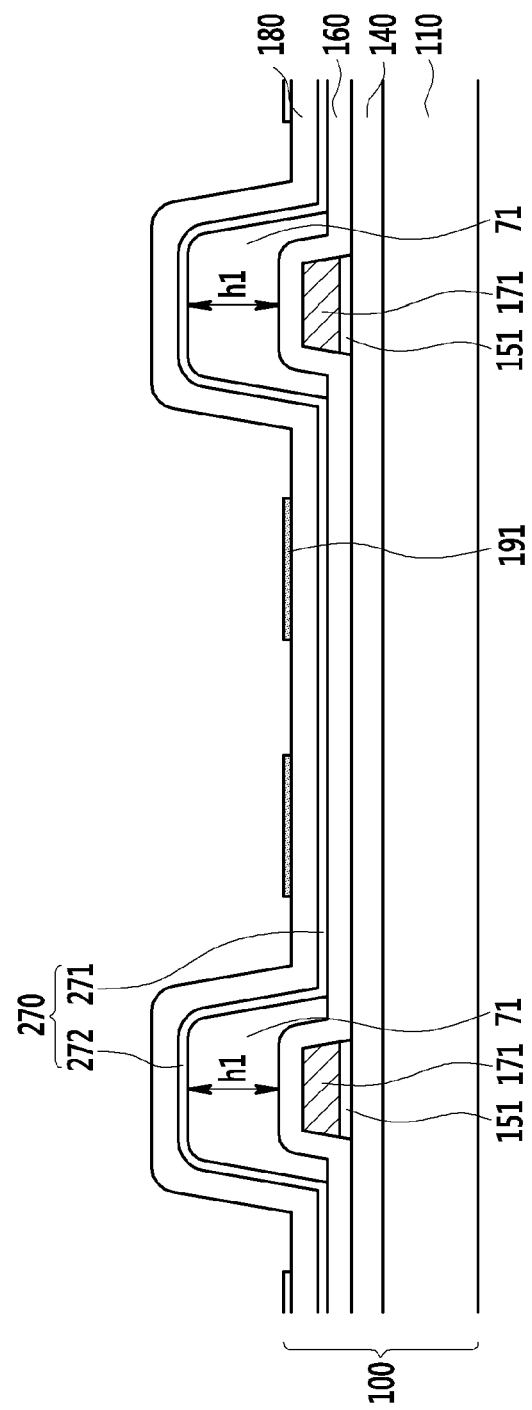
FIG. 9 is a cross-sectional view of the liquid crystal display of FIG. 7 taken along line IX-IX.

FIG. 4 and FIG. 7 are plan views of an exemplary embodiment of a manufacturing method of a liquid crystal display according to the invention, FIG. 5 is a cross-sectional view of the liquid crystal display of FIG. 4 taken along line V-V, FIG. 6 is a cross-sectional view of the liquid crystal display of FIG. 4 taken along line VI-VI, FIG. 8 is a cross-sectional view of the liquid crystal display of FIG. 7 taken along line VIII-VIII, and FIG. 9 is a cross-sectional view of the liquid crystal display of FIG. 7 taken along line IX-IX.

First, as shown in FIG. 4 to FIG. 6, a gate line 121 including a gate electrode 124 is formed on a substrate 110. A gate insulating layer 140 is deposited thereon. A semiconductor 151 and 154, a data line 171 and a drain electrode 175 are formed on the gate insulating layer 140. The semiconductor 151 and 154, the data line 171 and the drain electrode 175 may be simultaneously formed by using a half-tone mask such that a number of masks may be reduced, thereby reducing the manufacturing cost.

As shown in FIG. 7 to FIG. 9, an interlayer insulating layer 160 is formed on the gate insulating layer 140, the data line 171, the drain electrode 175 and the exposed semiconductor 154. Also, a coating member 71 of a predetermined height h1 is formed at the portion corresponding to the data line 171, on the interlayer insulating layer 160.

Further, a common electrode 270 is formed on the interlayer insulating layer 160 and the coating member 71. The common electrode 270 includes a plane common electrode 271 formed on the interlayer insulating layer 160 and a shielding common electrode 272 covering the coating member 71.

Also, a planarization layer 180 covering the common electrode 270 and the interlayer insulating layer 160 is formed. A contact hole 81 is formed in the interlayer insulating layer 160 and the planarization layer 180 to expose a portion of the drain electrode 175. A pixel electrode 190 is formed on the planarization layer 180. The pixel electrode 190 is connected to the drain electrode 175 via the contact hole 81.

As shown in FIG. 1 to FIG. 3, an alignment layer 11 is formed on the lower display panel 100. A light alignment process is performed to align the alignment layer 11. The light alignment process irradiates light to material of the alignment layer 11 such as by using the mask to form a plurality of alignment regions having different alignment directions in the alignment layer 11. As described above, the alignment directions of the liquid crystal molecules positioned at the different alignment regions of the alignment layer having the different alignment directions are differentiated such that the initial alignment of the liquid crystal molecules is determined.

In using a positive type of liquid crystal, the light alignment is processed such that the positive type of liquid crystal molecules are aligned in the direction crossing the gate line 121. In using a negative type of liquid crystal, the light alignment is processed such that the negative type of liquid crystal molecules are aligned in the direction parallel with the gate line 121.

A light blocking member 220, a color filter 230 and an overcoat 240 are sequentially formed on a substrate 210 to form an upper display panel 200. Adjacent color filters 230 overlap on the light blocking member 220 such that the spacer 250 is defined at the light blocking member 220, and accordingly a separate spacer formation process is obviated, thereby simplifying the manufacturing process.

Also, a liquid crystal layer 3 is injected between the upper display panel 200 and the lower display panel 100 to complete the liquid crystal display.

As described above, the alignment layer 11 is formed by subjecting an alignment material layer to the alignment process by using the light alignment process such that a relatively large thickness of the planarization layer 180 is obviated, thereby simplifying the manufacturing process and reducing the manufacturing cost. Also, in using the light alignment process, the separate rubbing device for the alignment process is obviated such that static electricity or dust is not generated, thereby improving the yield of the manufacturing process. Further, differently from using the rubbing device, a defect at a step portion of an alignment material layer defined by the relatively thick planarization layer is not generated in the light alignment process, thereby realizing a clear black color in the liquid crystal display.

In the illustrated exemplary embodiment, the coating member is disposed only at the position corresponding to the data line 171, considered outside or at an outer edge of the pixel area. However, in another exemplary embodiment a coating member may be disposed inside the pixel area.

Another exemplary embodiment will be described with reference to FIG. 10 and FIG. 11.

Figure 10:
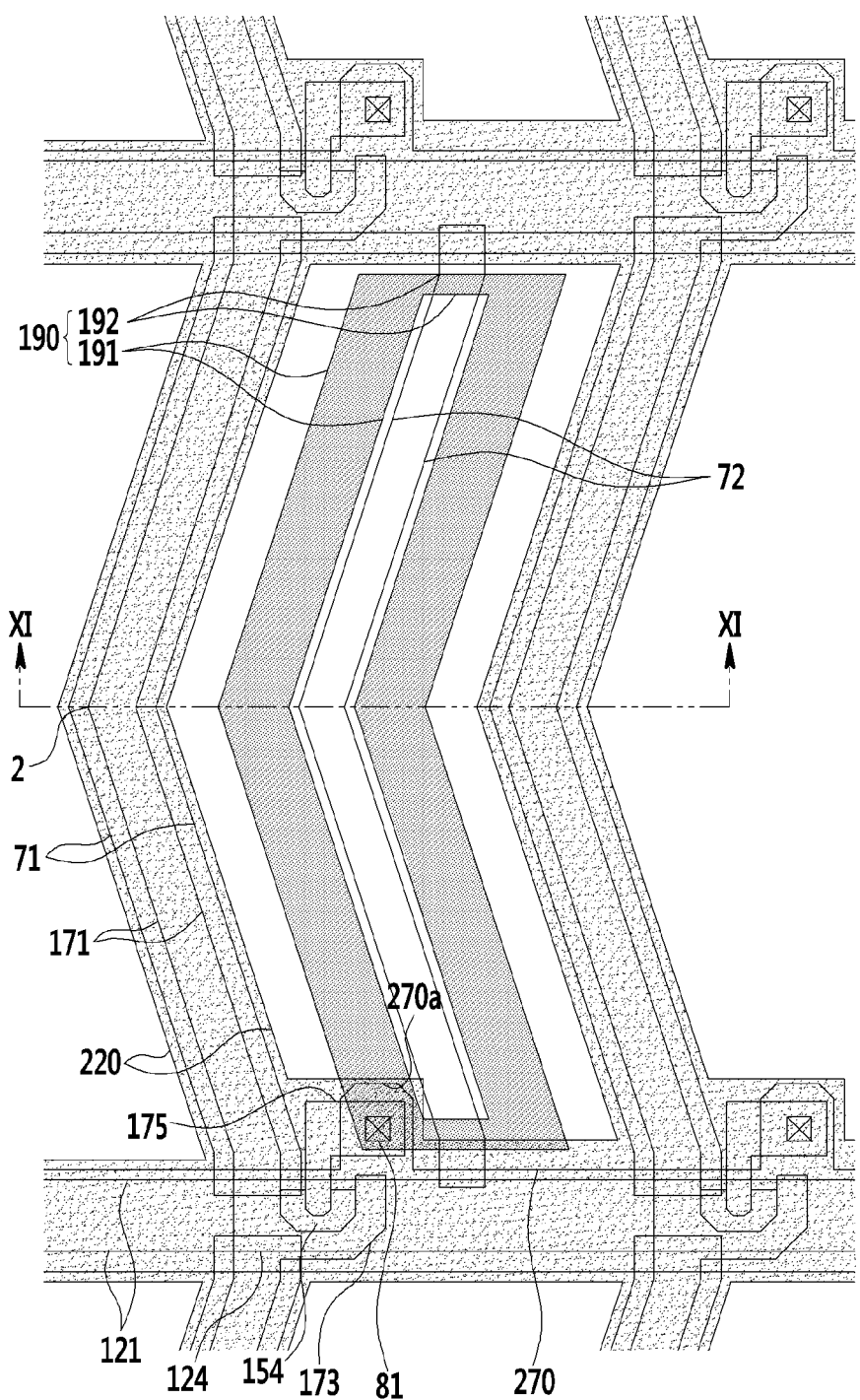
FIG. 10 is a plan view of another exemplary embodiment of a liquid crystal display according to the invention.
Figure 11:
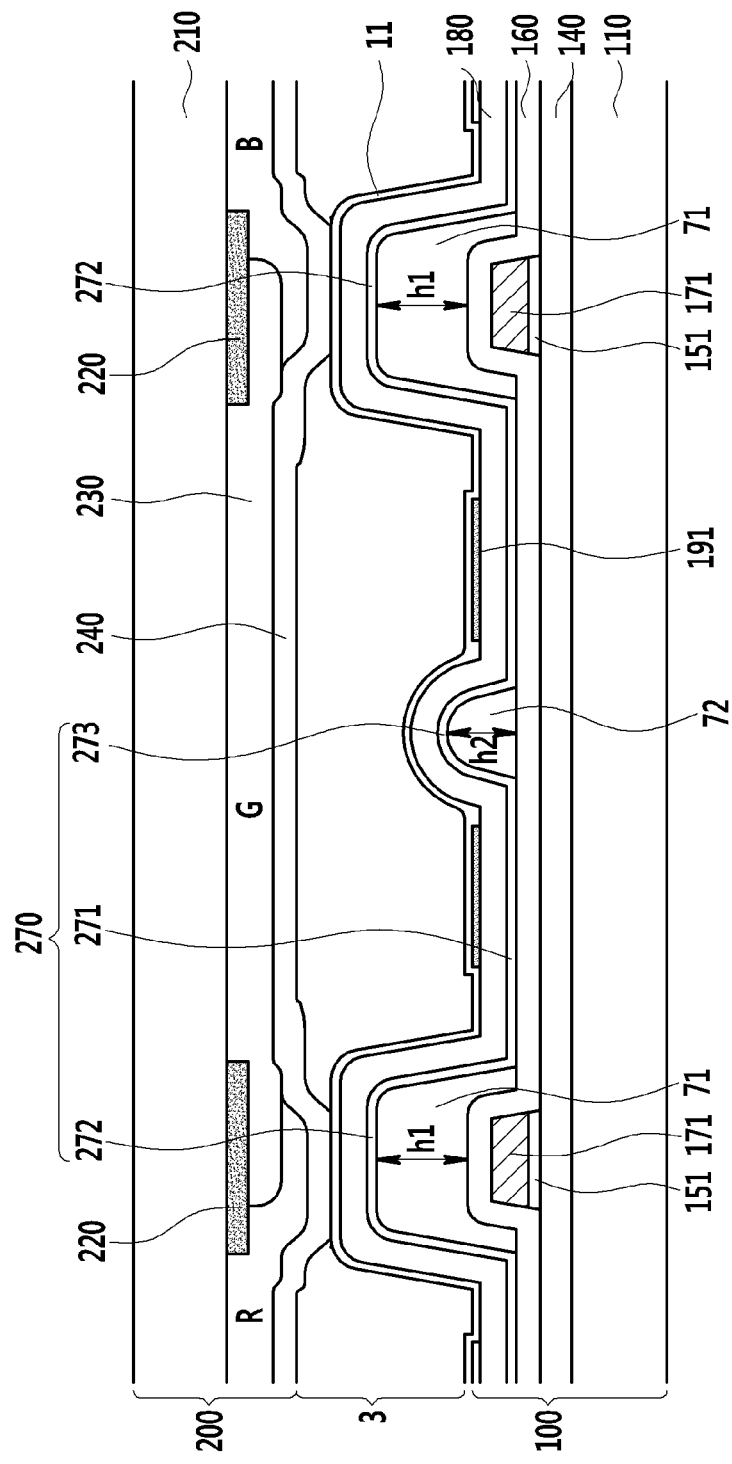
FIG. 11 is a cross-sectional view of the liquid crystal display of FIG. 10 taken along line XI-XI.

FIG. 10 is a plan view of another exemplary embodiment of a liquid crystal display according to the invention, and FIG. 11 is a cross-sectional view of the liquid crystal display of FIG. 10 taken along line XI-XI.

The exemplary embodiment shown in FIG. 10 and FIG. 11 is substantially the same as the exemplary embodiment shown in FIG. 1 to FIG. 3 except that a coating member is disposed inside the pixel area such that the repeated description is omitted.

As shown in FIG. 10 and FIG. 11, in the liquid crystal display, the coating member 71 of the predetermined height h1 is disposed at the portion corresponding to the data line 171, above the interlayer insulating layer 160. Also, a first pixel coating member 72 is disposed between a pair of adjacent branch electrodes 191, above the interlayer insulating layer 160. The first pixel coating member 72 is disposed at a same layer as the coating member 71 among layers of the lower display panel 100 disposed on the substrate 110.

In cross-section, the first pixel coating member 72 may have the trapezoidal shape or the semi-circular shape, and may include an insulator material having the relatively low dielectric rate of less than about 3.0. Particularly, the first pixel coating member 72 is disposed inside the pixel area so as to improve the aperture ratio.

A common electrode 270 is disposed on the interlayer insulating layer 160, the coating member 71 and the first pixel coating member 72. The common electrode 270 includes the plane common electrode 271 covering most of the pixel area and disposed on the interlayer insulating layer 160, the shielding common electrode 272 covering the coating member 71 of the predetermined height h1, and a first protrusion common electrode 273 covering the first pixel coating member 72 of the predetermined height h2.

Since the shielding common electrode 272 is disposed on the coating member 71 of the predetermined height h1, the shielding common electrode 272 is positioned higher than the pixel electrode 190 with reference to a same reference, thereby easily blocking the electric field of the pixel electrode 190 of the adjacent pixel area. As illustrated in FIG. 11 for example, a maximum distance of the shielding common electrode 272 from an upper surface of the substrate 110 is greater than a maximum distance of the pixel electrode 190 from the upper surface of the substrate 110. Accordingly, the pixel electrode 190 is not influenced by the electric field of a pixel electrode in an adjacent pixel area such that crosstalk is not generated.

Also, in a conventional liquid crystal device, a high driving voltage is used to drive liquid crystal due to the electric field formed between common and pixel electrodes. Since the first protrusion common electrode 273 positioned in the pixel area is positioned at the predetermined height h2, a relatively stronger electric field is formed between the first protrusion common electrode 273 positioned at the predetermined height and the pixel electrode 190 as compared to the conventional liquid crystal device. Therefore, liquid crystal in the liquid crystal display according to the invention is driven by a relatively small driving voltage compared to that of the conventional liquid crystal display owing to the relatively strong electric field between the first protrusion common electrode 273 and the pixel electrode 190, thereby minimizing power consumption.

In the illustrated exemplary embodiment, the first pixel coating member is only disposed within the pixel area and not overlapping the pixel electrode, but is not limited thereto. However, in another exemplary embodiment, a further pixel coating member may be disposed under (e.g., overlapping) the branch electrode.

Another exemplary embodiment will be described with reference to FIG. 12 and FIG. 13.

Figure 12:
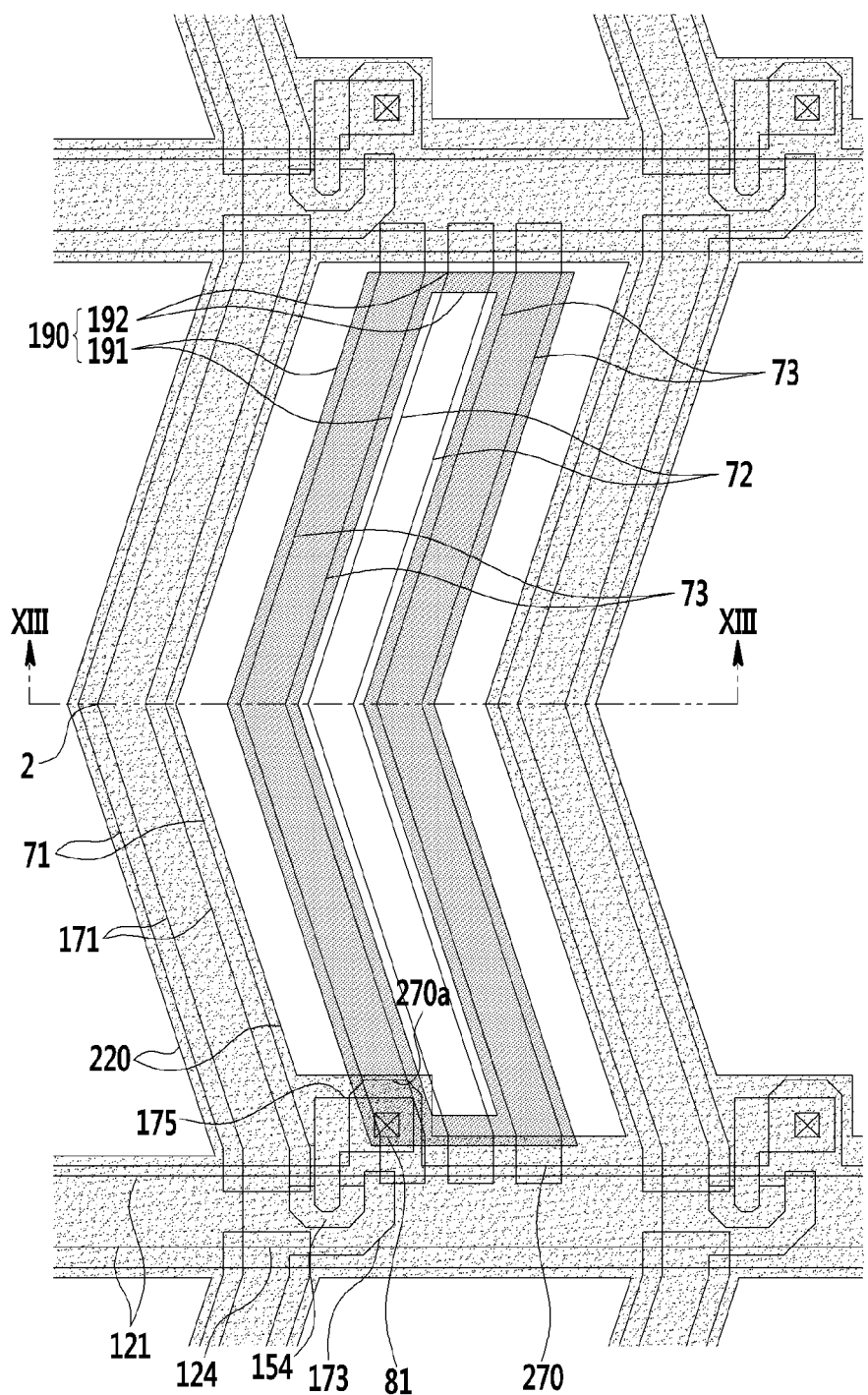
FIG. 12 is a plan view of still another exemplary embodiment of a liquid crystal display according to the invention.
Figure 13:
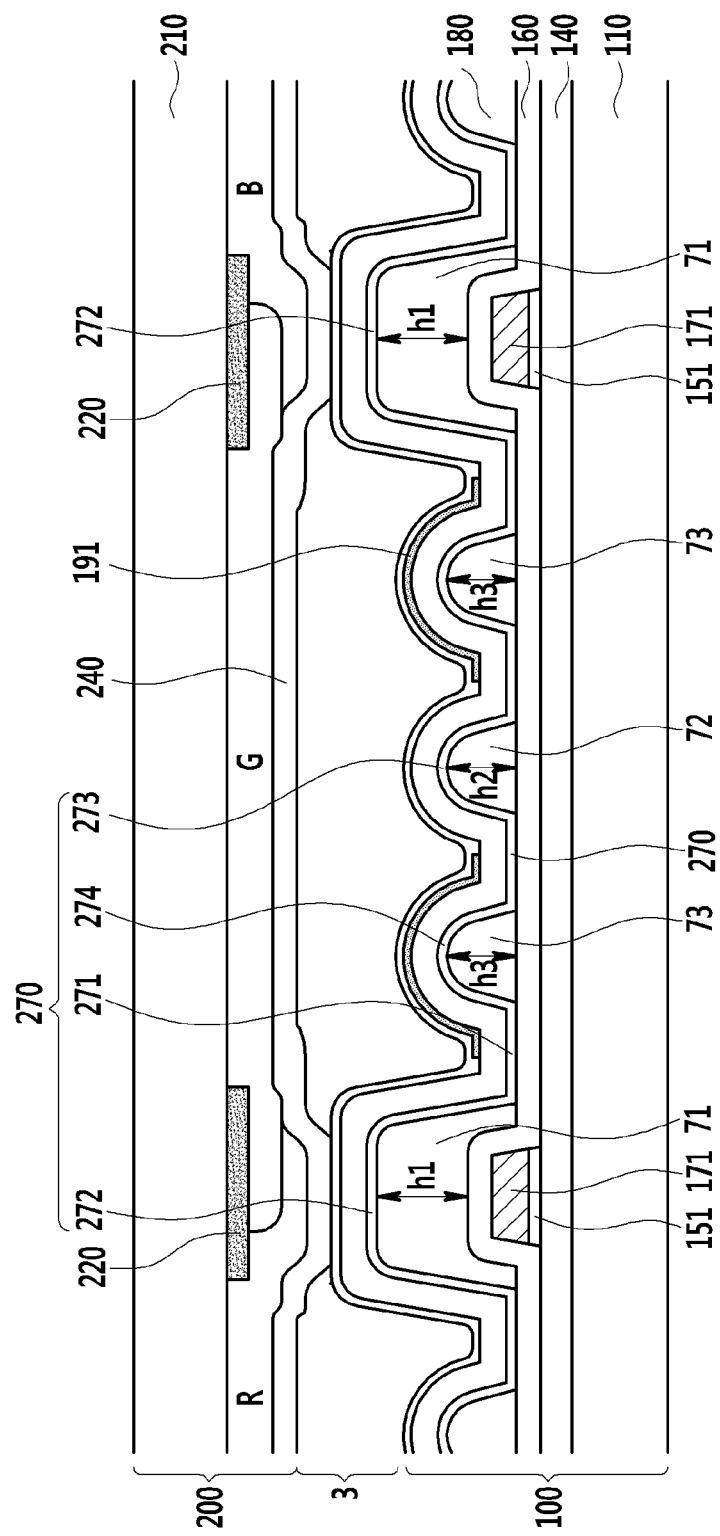
FIG. 13 is a cross-sectional view of the liquid crystal display of FIG. 12 taken along line XIII-XIII.

FIG. 12 is a plan view of still another exemplary embodiment of a liquid crystal display according to the invention, and FIG. 13 is a cross-sectional view of the liquid crystal display of FIG. 12 taken along line XIII-XIII.

The exemplary embodiment shown in FIG. 12 and FIG. 13 is substantially the same as the exemplary embodiment shown in FIG. 10 and FIG. 1 except for a further pixel coating member disposed within the pixel area such that the repeated description is omitted.

As shown in FIG. 12 and FIG. 13, in the liquid crystal display, the coating member 71 of the predetermined height h1 is disposed at the portion corresponding to the data line 171, above the interlayer insulating layer 160.

The first pixel coating member 72 is disposed between adjacent branch electrodes 191, above the interlayer insulating layer 160. A second pixel coating member 73 is disposed between the interlayer insulating layer 160 and the branch electrode 191.

The second pixel coating member 73 is disposed at the same layer as the first pixel coating member 72 and the coating member 71 among layers of the lower display panel 100 disposed on the substrate 110. In cross-section, the second pixel coating member 73 may have the trapezoidal shape or the semi-circular shape and may include an insulator material with the relatively low dielectric rate of less than about 3.0. Particularly, the second pixel coating member 73 is disposed inside the pixel area so as to improve the aperture ratio.

A common electrode 270 is disposed on the interlayer insulating layer 160, the coating member 71, the first pixel coating member 72 and the second pixel coating member 73. The common electrode 270 includes the plane common electrode 271 covering most of the pixel area and disposed on the interlayer insulating layer 160, the shielding common electrode 272 covering the coating member 71 of the predetermined height h1, the first protrusion common electrode 273 covering the first pixel coating member 72 of the predetermined height h2, and a second protrusion common electrode 274 of the second pixel coating member 73 of a predetermined height h3.

Since the shielding common electrode 272 is disposed on the coating member 71 of the predetermined height h1, the shielding common electrode 272 is positioned higher than the pixel electrode 190 with reference to a same reference, thereby easily blocking the electric field of the pixel electrode in an adjacent pixel area. Accordingly, the cross-talk is not generated by the electric fields of the pixel electrodes in adjacent pixel areas.

Also, in a conventional liquid crystal device, a high driving voltage is used to drive liquid crystal due to the electric field formed between common and pixel electrodes. Since the first protrusion common electrode 273 and the second protrusion common electrode 274 positioned in the pixel area are positioned at the predetermined heights h2 and h3, a relatively stronger electric field is formed between the first protrusion common electrode 273 and the second protrusion common electrode 274 positioned at the predetermined heights h2 and h3, and a respective pixel electrode 190, as compared to the conventional liquid crystal device. Therefore, liquid crystal in the liquid crystal display according to the invention is driven by a relatively small driving voltage compared to that of the conventional liquid crystal display owing to the relatively strong electric field between the first protrusion common electrode 273 and the second protrusion common electrode 274, and the pixel electrode 190, thereby minimizing the power consumption.

While this disclosure has been described in connection with what is presently considered to be practical exemplary embodiments, the disclosure is not limited to the disclosed exemplary embodiments, but, on the contrary, is intended to cover various modifications and equivalent arrangements included within the spirit and scope of the appended claims.

What is claimed is:
1. A liquid crystal display comprising:
 a substrate;
 a gate line and a data line on the substrate, insulated from and crossing each other;

a thin film transistor connected to the gate line and the data line;
an interlayer insulating layer on the thin film transistor;
a coating member on the interlayer insulating layer, the coating member elongated to overlap the data line;
a common electrode on the interlayer insulating layer, the common electrode overlapping the coating member;
a planarization layer covering the common electrode; and
a pixel electrode on the planarization layer.

2. The liquid crystal display of claim 1, wherein
the common electrode includes:
 a shielding common electrode overlapping the coating member overlapping the data line; and
 a plane common electrode extended from the shielding common electrode and away from the data line, and
a maximum distance from the substrate to the shielding common electrode overlapping the coating member overlapping the data line is greater than a maximum distance from the substrate to the pixel electrode.

3. The liquid crystal display of claim 2, wherein
the pixel electrode includes:
 a plurality of branch electrodes separated from each other; and
 a connection electrode connecting the branch electrodes to each other, and
further comprising a first pixel coating member between adjacent branch electrodes among the plurality of branch electrodes, in a plan view.

4. The liquid crystal display of claim 3, wherein
the first pixel coating member is in a same layer as the coating member among layers disposed on the substrate.

5. The liquid crystal display of claim 3, further comprising:
 a second pixel coating member overlapping the plurality of branch electrodes.

6. The liquid crystal display of claim 5, wherein
the second pixel coating member is in a same layer as the coating member among layers disposed on the substrate.

7. The liquid crystal display of claim 5, wherein
the first pixel coating member and the second pixel coating member comprises a transparent insulator.

8. The liquid crystal display of claim 1, wherein
a width of the coating member is larger than a width of the data line.

9. The liquid crystal display of claim 1, wherein
the coating member comprises an insulator having a dielectric rate of less than about 3.0.

10. The liquid crystal display of claim 1, wherein
the thin film transistor includes a gate electrode as a portion of the gate line, a source electrode as a portion of the data line, and a drain electrode separated from the source electrode,
a common electrode groove is defined in the common electrode, exposing a portion of the drain electrode,
a contact hole is defined in the interlayer insulating layer and the planarization layer, and
the drain electrode is connected to the pixel electrode via the common electrode groove and the contact hole.

11. A method for manufacturing a liquid crystal display, comprising:
 forming a gate line and a data line, on a substrate;
 forming a thin film transistor connected to the gate line and the data line;
 forming an interlayer insulating layer covering the thin film transistor;
 forming a coating member on the interlayer insulating layer, the coating member elongated to overlap the data line;
 forming a common electrode on the interlayer insulating layer, the common electrode overlapping the coating member;
 forming a planarization layer covering the common electrode; and
 forming a pixel electrode on the planarization layer.

12. The method of claim 11, further comprising:
forming an alignment layer on the pixel electrode; and
performing a light alignment process to the alignment layer.

13. The method of claim 11, wherein the forming the common electrode comprises:
 forming a shielding common electrode overlapping the coating member overlapping the data line; and
 forming a plane common electrode extended from the shielding common electrode and away from the data line,
wherein a maximum distance from the substrate to the shielding common electrode overlapping the coating member overlapping the data line is greater than a maximum distance from the substrate to the pixel electrode.

14. The method of claim 13, further comprising
forming a first pixel coating member in a same layer as the coating member among layers disposed on the substrate,
wherein
the pixel electrode includes:
 a plurality of branch electrodes separated from each other, and
 a connection electrode connecting the branch electrodes to each other, and
the first pixel coating member is between adjacent branch electrodes among the plurality of branch electrodes, in a plan view.

15. The method of claim 14, further comprising:
forming a second pixel coating member in a same layer as the coating member among layers disposed on the substrate, and
wherein the second pixel coating member overlaps the plurality of branch electrodes.

* * * * *